United States Patent [19]

Ozaki et al.

[11] Patent Number: 4,673,789
[45] Date of Patent: Jun. 16, 1987

[54] POWER SOURCE FOR WIRE CUT ELECTRICAL DISCHARGE MACHINING

[75] Inventors: Yoshio Ozaki; Kazuo Tsurumoto, both of Aichi, Japan

[73] Assignee: Mitsubishi Denki Kabushiki Kaisha, Tokyo, Japan

[21] Appl. No.: 579,196
[22] PCT Filed: May 25, 1983
[86] PCT No.: PCT/JP83/00158
§ 371 Date: Jan. 25, 1984
§ 102(e) Date: Jan. 25, 1984
[87] PCT Pub. No.: WO83/04203
PCT Pub. Date: Dec. 8, 1983

[30] Foreign Application Priority Data

May 25, 1982 [JP] Japan .................. 57-88304

[51] Int. Cl.⁴ .............. B23H 1/02; B23H 7/04
[52] U.S. Cl. .................. 219/69 W; 219/69 C
[58] Field of Search .......... 219/69 W, 69 P, 69 C, 219/69 S; 323/283

[56] References Cited

U.S. PATENT DOCUMENTS

| 3,745,298 | 7/1973 | Malesh | 219/69 C |
| 3,916,138 | 10/1975 | Pfau | 219/69 P |
| 4,054,820 | 10/1977 | Foster | 323/283 |
| 4,267,423 | 5/1981 | Bell, Jr. et al. | 219/69 C |
| 4,288,675 | 9/1981 | Inoue | 219/69 P |
| 4,309,650 | 1/1982 | Boros et al. | 323/283 |
| 4,323,958 | 4/1982 | Nowell | 323/283 |
| 4,350,863 | 9/1982 | Inoue | 219/69 P |
| 4,392,043 | 7/1983 | Inoue | 219/69 C |
| 4,442,333 | 4/1984 | Inoue | 219/69 W |

FOREIGN PATENT DOCUMENTS

| 27345 | 4/1981 | European Pat. Off. | 219/69 S |
| 38662 | 10/1981 | European Pat. Off. | 219/69 P |
| 48-55496 | 8/1973 | Japan . | |
| 54-43394 | 4/1979 | Japan . | |
| 131200 | 10/1979 | Japan | 219/69 P |
| 55-18346 | 2/1980 | Japan . | |
| 55-46876 | 4/1980 | Japan | 323/283 |
| 57-71725 | 5/1982 | Japan | 219/69 S |
| 747676 | 7/1980 | U.S.S.R. . | |
| 687707 | 12/1981 | U.S.S.R. . | |

Primary Examiner—Roy N. Envall, Jr.
Assistant Examiner—Geoffrey S. Evans
Attorney, Agent, or Firm—Sughrue, Mion, Zinn, Macpeak, and Seas

[57] ABSTRACT

In a power source for wire cut electrical discharge machining by which a pulsating voltage which is higher than a discharge voltage and has a quiescent time is applied to cause an intermittent discharge between the poles defined by an electrode wire and the material to be machined, the quiescent time or the discharge current continuing time is controlled in accordance with the number of times of a repeated discharge in order to restrict an average current flowing between the poles per unit time to a predetermined level to prevent the breakage of the wire and increase the machining speed.

6 Claims, 7 Drawing Figures

POWER SOURCE FOR WIRE CUT ELECTRICAL DISCHARGE MACHINING

TECHNICAL FIELD

This invention relates to a power source for wire cut electrical discharge machining. More particularly, it provides a power source by which pulses having a controlled voltage which is higher than a discharge voltage are applied between the material to be machined and an electrode wire extending therethrough (i.e., between the poles) to cause an intermittent discharge to take place between the poles to effect wire cut electrical discharge machining.

BACKGROUND ART

A conventional power source for wire cut electrical discharge machining is diagrammatically shown in FIG. 1. An electrode wire 10 is unwound from a reel not shown, fed through an initial hole 100 in the material 12 to be machined, and wound on a reel not shown. A condenser 14 is connected between the electrode wire 10 and the material 12 in parallel thereto. A currentlimiting resistance 18 and a switching transistor 20 are connected in series to a circuit connecting the condenser 14 and a DC power source 16. An oscillator 22 generates an ON-OFF signal which turns on and off the switching transistor 20 to apply a pulsating voltage (and current) between the poles. According to the power source device shown in FIG. 1, the condenser 14 is charged through the resistance 18, and if the insulation between the poles is broken to cause a discharge, the energy stored in the condenser 14 is discharged between the poles, while the charge remains stored in the condenser 14 if no discharge takes place. The maximum average current ($\bar{I}$max) supplied between the poles depends on the electrical conditions, such as the duty factor D and resistance R of a pulse from the switching transistor 20, and is expressed by the following equation:

$$\bar{I}\text{max} = \frac{E}{R} \times D$$

in which E stands for the voltage of the power source 16.

In electrical discharge machining, no discharge takes place immediately upon application of a voltage between the poles, but there usually occurs a time lag which is called no-load time. The average current $\bar{I}$ is, therefore, low during actual machining. The average current $\bar{I}$ is generally proportional to the speed at which the material 12 to be machined is fed, and increases with an increase in the speed if the electrical conditions are not changed.

Thus, the maximum average current $\bar{I}$max is the maximum value of the current which can be supplied for the circuit of a power source for wire cut electrical discharge machining, and the average current value based on the assumption that there is not any no-load time. The average current $\bar{I}$ is the average current obtained when there is some no-load time, i.e., during actual machining operation, and varies with the progress of the operation. The current $\bar{I}$ has hitherto been about 8 A at maximum.

As the speed at which the material to be machined is fed is increased, the average current $\bar{I}$ increases, and if it exceeds about a half of $\bar{I}$max, the machining operation becomes very unstable. In order to increase the material feeding speed, therefore, it is not sufficient to increase $\bar{I}$, but it is also necessary to increase $\bar{I}$max. There is, however, a limit to the current which can be supplied to the electrode wire 10, and if a current $\bar{I}_0$ exceeding the limit is supplied thereto, the wire 10 is broken. The threshold current $\bar{I}_0$ depends on, for example, the material and diameter of the electrode wire 10. The stability of the machining operation is obtained if the average current $\bar{I}$ is lower than the threshold current $\bar{I}_0$. In other words, there is no wire breakage if $\bar{I}$ and $\bar{I}$max are lower than $\bar{I}_0$. If $\bar{I}$max is lower than $\bar{I}_0$, there is no fear of the wire being broken, even if $\bar{I}$ may become very close to $\bar{I}$max on rare occasions due to an external disorder, or changes in the operating conditions, such as nonuniformity in the thickness of the material to be machined, or during the instability of operation which may occur during the machining of a corner. If $\bar{I}$ exceeds about a half of $\bar{I}$max, however, the operation lacks stability; therefore, it is usually possible to supply only a current which is lower than a half of the threshold current $\bar{I}_0$, resulting in a reduction of the material feeding speed to about a half of the ideal speed. The ideal speed is the speed at which the value of $\bar{I}$ is equal to that of $\bar{I}_0$.

According to the conventional power source disclosed in Japanese Patent Publication No. 13195/1969, no condenser is connected between the poles in parallel thereto, but an electric current is supplied between the poles directly by the ON-OFF operation of a switching transistor. According to this system, an electric current is supplied between the poles for a predetermined length of time if the appearance of a discharge is detected by application of a voltage between the poles, and then, the supply of the current is discontinued for a predetermined length of time. This system makes it possible to control uniformly the peak value of the discharge current supplied between the poles after the appearance of a discharge has been detected, and the duration of its supply, and thereby increase the machining speed in accordance with the surface roughness of the material to be machined. This system, however, has the disadvantages hereinabove pointed out of the conventional power source shown in FIG. 1. If $\bar{I}$ exceeds about a half of $\bar{I}$max, the operation becomes unstable; therefore, it is possible to employ only a current which is lower than a half of the threshold current $\bar{I}_0$ and achieve a material feeding speed which is only lower than about a half of the ideal speed.

DISCLOSURE OF THE INVENTION

In view of the problems hereinabove pointed out, this invention provides a power source for wire cut electrical discharge machining which makes it possible to prevent the breakage of an electrode wire and increase the machining speed. The time for which the supply of a discharge current is discontinued, or the time for which it is continued is controlled in accordance with the frequency of repetition of an electrical discharge so that the average current supplied between the electrode wire and the material to be machined per unit time may be restricted to a predetermined level lower than the threshold current at which the wire may be broken during the machining operation.

BEST MODE OF CARRYING OUT THE INVENTION

Figure 1:
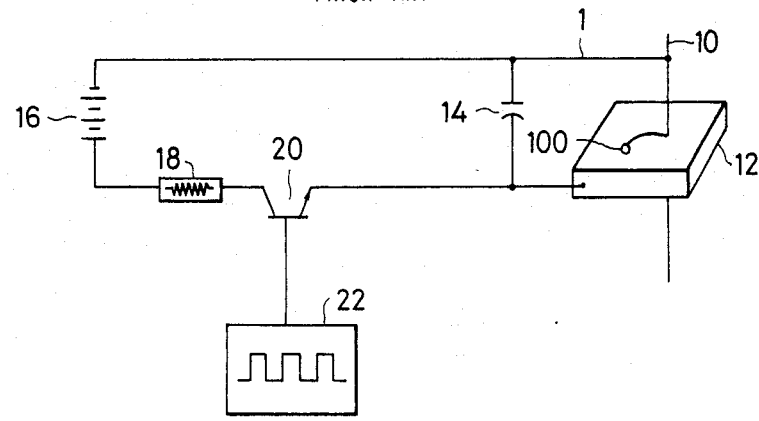
FIG. 1 is a schematic diagram showing a conventional power source for wire cut electrical discharge machining.
Figure 2:
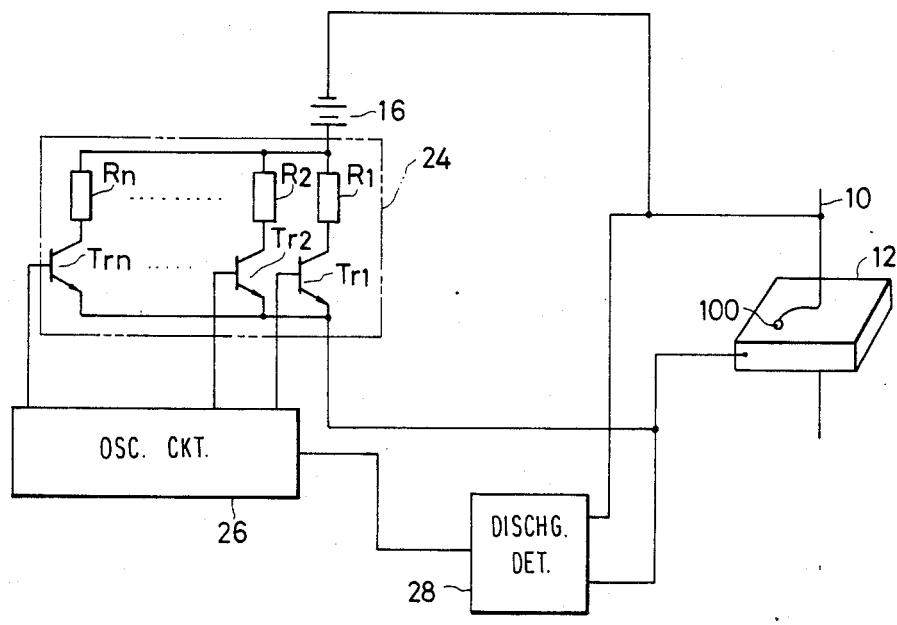
FIG. 2 is a schematic diagram showing a power source for wire cut electrical discharge machining embodying this invention.

An embodiment of this invention is shown in FIG. 2. Like numerals are used to indicate like parts in FIGS. 1 and 2. Referring to FIG. 2, a power source 16 and a switching circuit 24 are connected in series between the poles defined by an electrode wire 10 and the material 12 to be machined. The switching circuit 24 comprises a parallel combination of a plurality of sets of serially connected transistors $Tr_1$ to $Tr_n$ and resistances $R_1$ to $R_n$. An oscillating circuit 26 controls the circuit continuity of the transistors $Tr_1$ to $Tr_n$. A discharge detecting circuit 28 detects the appearance of a discharge between the poles by a voltage between the poles or a current flowing therebetween, and transmits a signal to the oscillating circuit 26 to drive it.

Figure 3:
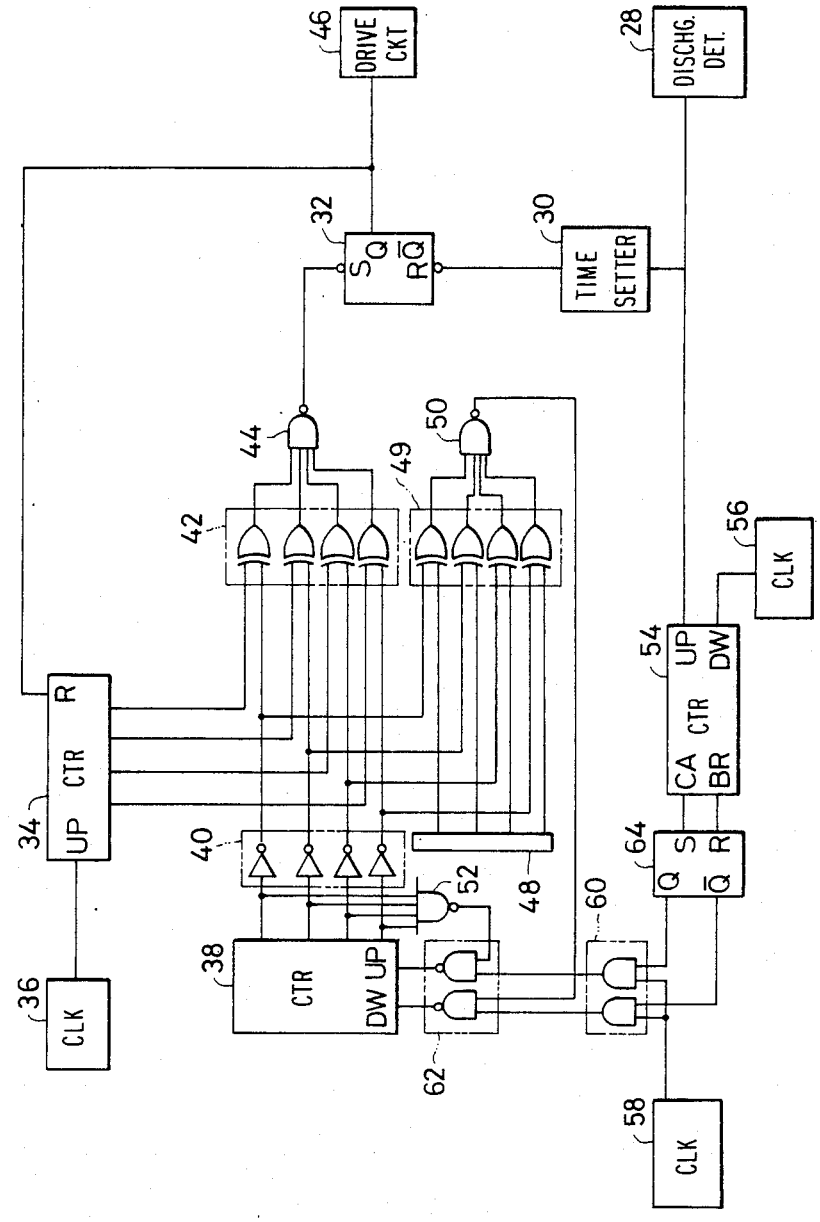
FIG. 3 is a diagram showing by way of example an oscillating circuit which is used in the apparatus shown in FIG. 2.

FIG. 3 is a diagram showing an example of the oscillating circuit 26 in the apparatus shown in FIG. 1.

The operation of the apparatus embodying this invention will be described with reference to FIG. 3. Referring to FIG. 3, if a voltage is applied between the poles to cause a discharge to appear therebetween, the discharge detecting circuit 28 detects it and transmits a pulse signal. This pulse signal is fed to a discharge current continuing time setting circuit 30. The time for which an electric current is supplied is measured by the circuit 30, and after a predetermined length of time, a reset pulse is transmitted to a flip-flop 32. If the flip-flop 32 is reset and the output of its Q terminal reaches the L level, the output of a drive circuit 46 also reaches the L level, and the transistors $Tr_1$ to $Tr_n$ are turned off. The circuit 30 may comprise a clock circuit and a counter, or may alternatively comprise a one-shot multivibrator.

Figure 4:
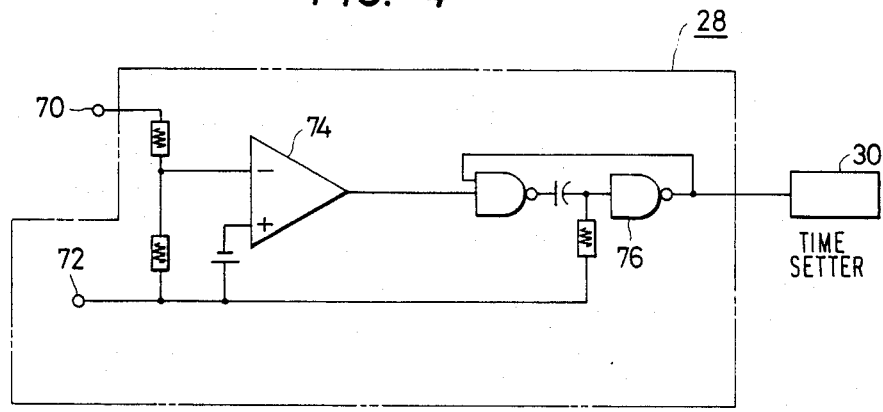
FIG. 4 is a diagram showing by way of example a discharge detecting circuit which is used in the apparatus shown in FIG. 2.
Figure 5:
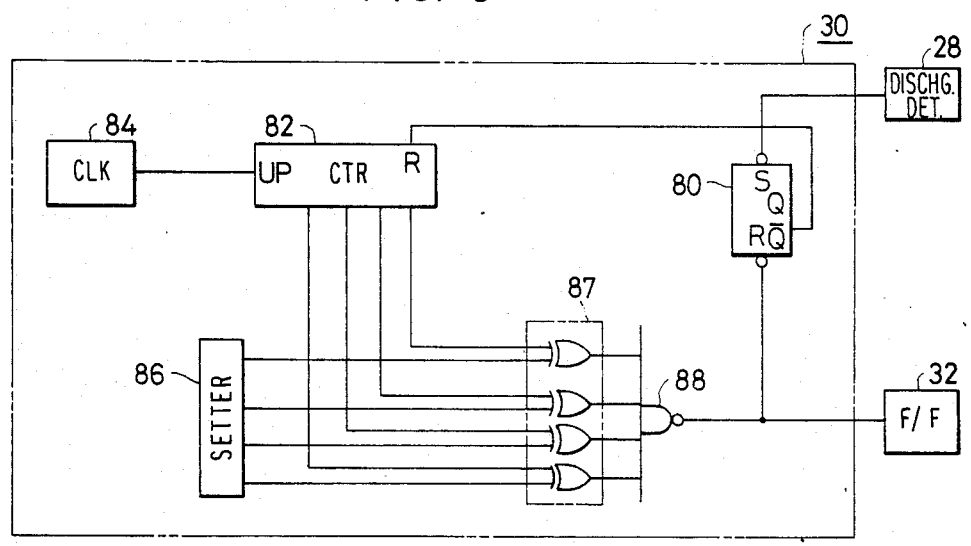
FIG. 5 is a diagram showing by way of example a discharge current continuing time setting circuit which constitutes the oscillating circuit shown in FIG. 3.
Figure 6:
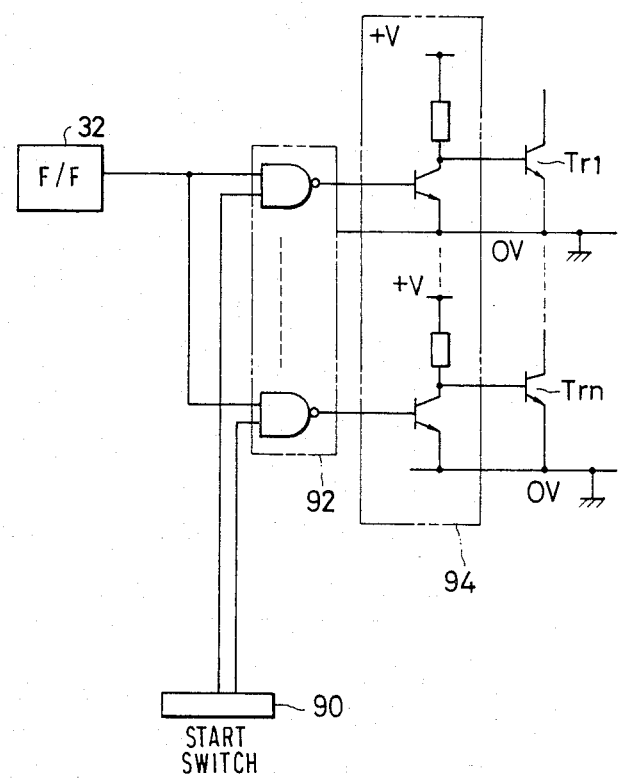
FIG. 6 is a diagram showing by way of example a drive circuit which constitutes the oscillating circuit shown in FIG. 3.

FIG. 4 shows a specific example of the discharge detecting circuit 28. The voltage detected from between the poles is put in at a terminal 72 and compared by a comparator 74 with a reference voltage put in at a terminal 70, and the output of the comparator 74 is received by a one-shot multivibrator 76, whereby the appearance of a discharge between the poles is detected. FIG. 5 shows a specific example of the discharge current continuing time setting circuit 30. If a flip-flop 80 is set by the output signal of the discharge detecting circuit 28 and the output of its $\overline{Q}$ terminal reaches the L level, a counter 82 starts counting in response to a clock 84. If the counter 82 finishes counting a value set by a setter 86 and corresponding to a discharge current continuing time, an exclusive OR gate 87 and a NAND gate 88 transmit an output to the flip-flop 32. FIG. 6 shows a specific example of the drive circuit 46. It comprises a NAND gate 92 which receives a signal from a start switch 90 and an output from the Q terminal of the flip-flop 32, and a drive transistor 94 which drives the transistors $Tr_1$ to $Tr_n$ in response to the output of the NAND gate 92.

If the output of the Q terminal of the flip-flop 32 reaches the L level, a counter 34 is released from its reset position, and starts to count the pulses supplied by a clock pulse generator 36. The frequency of the pulses generated by the clock pulse generator 36 depends on the set quiescent time. The quiescent conditions are set on a counter 38 as will hereinafter be described. The output of the counter 38 which is transmitted through an inverter 40, and the output of the counter 34 are put into an exclusive OR gate 42, and the output of the gate 42 is transmitted to the S terminal of the flip-flop 32 through a NAND gate 44. The NAND gate 44 generates a pulse if the outputs of the counters 34 and 38 coincide with each other. In other words, if the counter 34 counts the output of the clock pulse generator 36 to a value set on the counter 38, the NAND gate 44 generates a pulse, whereby the quiescent time is counted. If the output of the NAND gate 44 is put in the terminal S of the flip-flop 32, the output of its Q terminal reaches the H level, and the transistors $Tr_1$ to $Tr_n$ are turned on in response to the output of the drive circuit 46.

The quiescent conditions are set on the counter 38 as will hereunder be described. If the output of the counter 38 coincides with the quiescent conditions set by a latch 48, a NAND gate 50 provides an L level output through an exclusive OR gate 49, and if not, the NAND gate 50 provides an H level output. A NAND gate 52 provides an L level output only when all of the outputs of the counter 38 are of the H level (i.e., in the case of maximum quiescence). Thus, the latch 48, exclusive OR gate 49 and NAND gate 50 constitute a setter for the maximum quiescent time.

The counter 38 is designed to receive an up or down signal. If the counter 38 receives an up signal, the quiescent time is prolonged, and if it receives a down signal, the quiescent time is shortened. In other words, the counter 38 constitutes a time setter of which the set time varies with the output of a counter 54.

The counter 54 is an up or down counter designed for receiving an up signal which is a discharge detecting signal from the discharge detecting circuit 28, or a down signal which is a clock pulse signal from a clock pulse generator 56. The frequency $f_L$ of the clock pulse generator 56, which corresponds to a limit current $\bar{I}_L$, is slightly lower than the frequency $f_0$ corresponding to the threshold current $\bar{I}_0$ which causes the wire to break. The limit current $\bar{I}_L$, the frequency $f_1$ and the discharge current continuing time $T_{ON}$ have a relationship which is expressed by the equation: $\bar{I}_L = E/R \times T_{ON} \times f_L$. The frequency $f_L$ is determined by the duration of voltage application between the poles, diameter and material of the electrode wire and pressure of a machining fluid, and defines the limit value of a discharge frequency.

The counter 54 compares the number of times of a discharge and the clock pulse corresponding to the limit current $\bar{I}_L$ every moment. If the number of times of a discharge increases, the carry (CA) terminal of the counter 54 generates an output pulse to set a flip-flop 64, and if the number of times of a discharge decreases, the borrow (BR) terminal of the counter 54 generates an output signal to reset the flip-flop 64. The counter 54 has a number of bits which is required for obtaining an average. Its sensitivity is lowered if the number of bits is increased, and raised if it is decreased. Thus, the counter 54 is a comparison counter.

If the flip-flop 64 is set, its Q terminal provides an H level output. This H level signal and a clock pulse from a clock pulse generator 58 are transmitted to the UP terminal of the counter 38 through an AND gate 60 and a NAND gate 62 to move forward the counter 38 to prolong the quiescent time. If the number of times of a discharge is greater than the output frequency of the clock pulse generator 56, the counter 38 is gradually moved forward until the maximum quiescence is obtained. If the number of times of a discharge is smaller, the borrow terminal of the counter 54 generates a pulse, and the $\overline{Q}$ terminal of the flip-flop 64 provides an H level output. This H level signal and the clock pulse from the clock pulse generator 58 are transmitted to the down (DW) terminal of the counter 38 to move the counter 38 backward to shorten the quiescent time. If the number of times of a discharge is smaller than the output frequency of the clock pulse generator 56, the counter 38 is gradually moved backward until the quiescent time coincides with the quiescent conditions set on the latch 48. The clock pulse generator 58 is a factor which determines the timing for a change in the quiescent time. If it has a short cycle, the quiescent time changes quickly. The electrode wire 10 does not break immediately with an increase in current, but usually when it has continued for, say, 50 or 60 msec. Therefore, the clock pulse generator 58 may have a cycle of, say, 5 or 6 msec.

If the number of times of a discharge exceeds a predetermined level (i.e., the average current $\overline{I}$ exceeds the limit current $\overline{I}_L$), the quiescent time is gradually prolonged so that the average current $\overline{I}$ may be lowered to a level lower than the limit current $\overline{I}_L$. If stability is obtained, the quiescent time is gradually changed until it reaches the quiescent time set by the notch. Thus, the maximum average current $\overline{I}_{max}$ that depends on the electrical conditions can be about twice higher than the threshold current $\overline{I}_0$ which causes the wire to break; therefore, the machining speed can be increased if the machining current $\overline{I}$ is raised to a level nearly equal to $\overline{I}_0$ during stable operation. It has experimentally been found that the power source of this invention enables a machining speed which is about 1.5 times higher than that which has hitherto been possible.

Although the apparatus shown in FIGS. 2 to 6 is designed for controlling the quiescent time in accordance with the number of times of a discharge, it is alternatively possible to control the discharge current continuing time by employing a circuit which is substantially equivalent to what has hereinabove been described.

Figure 7:
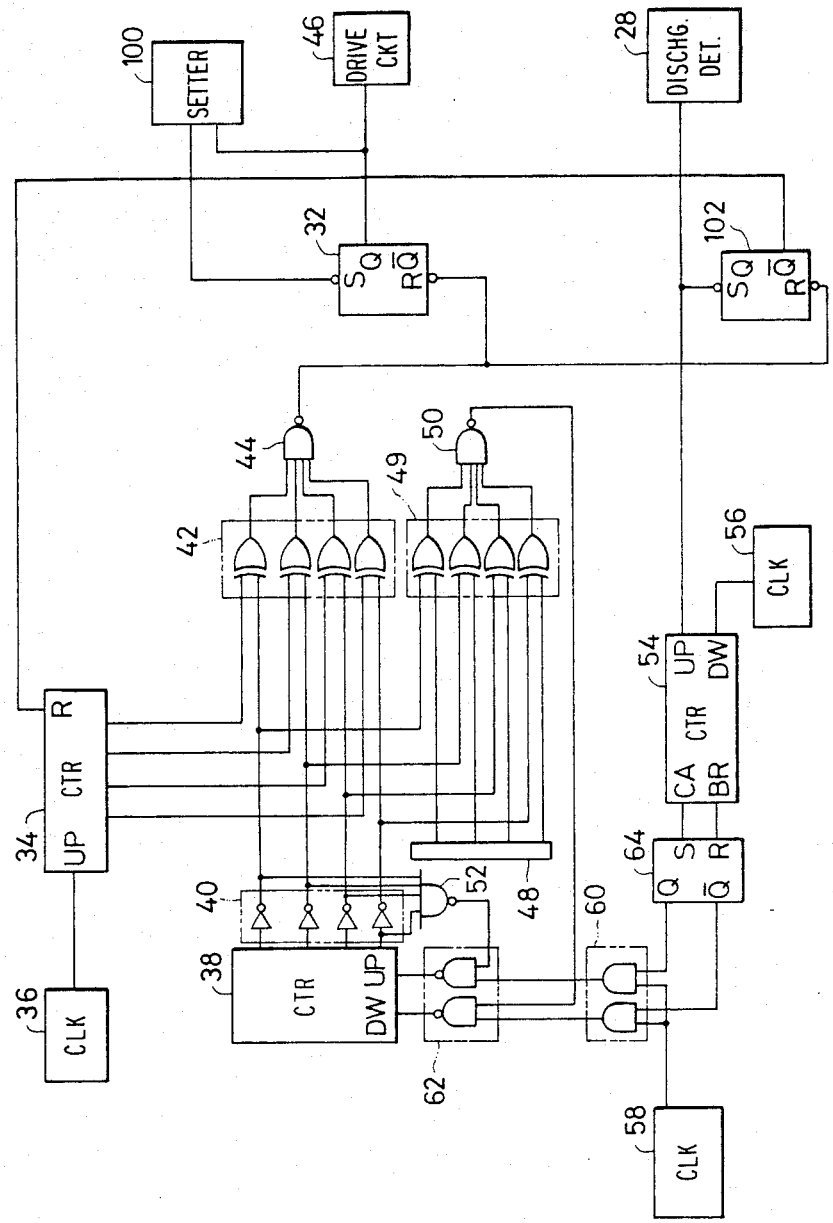
FIG. 7 is a diagram showing another example of the oscillating circuit used in the apparatus shown in FIG. 2.

FIG. 7 shows another example of the oscillating circuit 26 designed for controlling the discharge current continuing time. Like numerals are used to indicate like parts in FIGS. 3 and 7, so that no repeated description may be necessary. In the circuit of FIG. 7, the counter 38 is a counter which sets the discharge current continuing time. The flip-flop 32 is reset by the output of the NAND gate 44 so that its Q terminal may provide an L level output, and the drive circuit 46 turns off the transistors Tr$_1$ to Tr$_n$. A flip-flop 102 is set by a signal from the discharge detecting circuit 28 so that its $\overline{Q}$ terminal may provide an L level output, and the counter 34 starts counting. The Q terminal of the flip-flop 32 transmits an output to a quiescent time setter 100, and after the lapse of the set quiescent time, the setter 100 transmits an output to the set terminal S of the flip-flop 32 so that its Q terminal may provide an H level output to operate the drive circuit 46. The setter 100 may be equal in construction to the discharge current continuing time setting circuit shown in FIG. 5.

In case the discharge current continuing time is changed, control is made to decrease the pulse width, as opposed to the case in which the quiescent time is changed. The control of the average current per unit time may, therefore, be performed by the automatic control of the discharge current continuing time between the maximum (by the latch 48) and the minimum of the set values in accordance with the number of times of a discharge.

This invention makes it possible to prevent the breakage of an electrode wire and increase the machining speed, since the quiescent time or the discharge current continuing time is controlled in accordance with the number of times of a discharge to control the average current per unit time at a predetermined level lower than the threshold current which causes the wire to break.

We claim:

1. A power source for producing a discharge voltage for a wire-electrode type discharge machining apparatus, comprising:
    means for producing a signal indicating presence of a discharge between a wire electrode and a workpiece being machined with said wire electrode;
    a first clock source for producing as an output clock pulses at a first frequency, said first frequency being set in proportion to a limit current, said limit current being slightly less than a threshold current at which said wire will break;
    a first up-down counter receiving on one of count-up and count-down inputs thereof said signal indicative of said discharge and on the other of said count-up and count-down inputs said output of said first clock pulse source;
    a second clock source for producing as an output clock pulses at a second frequency, said frequency being set in accordance with a maximum allowed rate of change of duty cycle of said discharge voltage;
    a second up-down counter;
    means for applying said output of said second clock pulse source to one of a count-up and a count-down input of said second up-down counter selected in response to a count output of said first up-down counter;
    a third clock pulse source for producing as an output clock pulses at a third frequency, said third frequency being set in accordance with a duty cycle of said discharge voltage;
    a third counter receiving as a clock input said output of said third clock pulse source;
    means for comparing a count output of said second counter with a count output of said third counter;
    means for producing a pulse signal occurring a predetermined period of time following said signal indicative of said discharge; and means for turning ON said discharge voltage in response to an output of said comparing means and OFF in response to said pulse signal occurring said predetermined period of time following said signal indicative of said discharge.

wherein said first, second and third frequencies are set such that an average current flowing between said wire electrode and said workpiece is restricted to a predetermined level.

2. The power source of claim 1, further comprising means for inhibiting changes in a count output of said second counter so as to maintain said duty cycle of said discharge voltage within predetermined limits.

3. The power source of claim 2, wherein said inhibiting means comprises:

latch means for storing a value indicative of a maximum quiescent time of said discharge voltage;

second comparing means for comparing said count output of said second counter with said value stored in said latch means; and means for gating said count output of said first counter in response to a comparison output of said second comparing means.

4. The power source of claim 3, wherein said inhibiting means further comprises means for detecting a predetermined count output of said second counter, an output of said detecting means being applied to an input of said gating means.

5. The power source of claim 1, wherein said third frequency is set in accordance with a quiescent time of said discharge voltage.

6. The power source of claim 1, wherein said means for turning said discharge voltage ON and OFF comprises a flip-flop and a driver circuit receiving as an input an output from said flip-flop, said flip-flop having one of set and reset inputs receiving said pulse signal occurring said predetermined period of time following said signal indicative of said discharge and the other of said set and reset input receiving said output of said first comparing means.

* * * * *